US010807900B2

(12) United States Patent
Schenk et al.

(10) Patent No.: US 10,807,900 B2
(45) Date of Patent: Oct. 20, 2020

(54) METHOD FOR PRODUCING OPAQUE QUARTZ GLASS, AND BLANK MADE FROM THE OPAQUE QUARTZ GLASS

(71) Applicant: Heraeus Quarzglas GmbH & Co. KG, Hanau (DE)

(72) Inventors: Christian Schenk, Ingelheim (DE); Gerrit Scheich, Seligenstadt (DE); Nadine Tscholitsch, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 129 days.

(21) Appl. No.: 15/848,859

(22) Filed: Dec. 20, 2017

(65) Prior Publication Data
US 2018/0179098 A1    Jun. 28, 2018

(30) Foreign Application Priority Data

Dec. 23, 2016 (EP) .................................. 16206682

(51) Int. Cl.
| C03B 19/06 | (2006.01) |
| C03C 3/06 | (2006.01) |
| C03C 1/00 | (2006.01) |

(52) U.S. Cl.
CPC ............ *C03B 19/066* (2013.01); *C03C 1/006* (2013.01); *C03C 3/06* (2013.01); *C03B 2201/02* (2013.01); *C03C 2201/80* (2013.01)

(58) Field of Classification Search
CPC ........ C03B 19/06; C03B 19/09; C03B 19/066
See application file for complete search history.

(56) References Cited

U.S. PATENT DOCUMENTS

| 4,929,579 A * | 5/1990 | Lassiter ................. C04B 35/14 |
| | | 501/133 |
| 5,389,591 A * | 2/1995 | Guigonis ................ C03B 19/06 |
| | | 501/133 |

(Continued)

FOREIGN PATENT DOCUMENTS

| DE | 4338807 | 1/1995 |
| DE | 102006052512 | 5/2008 |
| EP | 1245703 | 10/2002 |

OTHER PUBLICATIONS

Kicevic ( Kicevic, D., Gasic, M., Markovic, D., "A statistical analysis of the influence of processing conditions on the properties of fused silica", Journal of the European Ceramic Society 16 (1996) 857-864).*

(Continued)

*Primary Examiner* — Jason L Lazorcik
(74) *Attorney, Agent, or Firm* — Dicke, Billig & Czaja, PLLC (57) ABSTRACT

In one method for producing opaque quartz glass, a green body is produced from a slip containing fine, amorphous $SiO_2$ particles and coarse $SiO_2$ reinforcement bodies and the green body is sintered by way of a sintering treatment into a blank made from the opaque quartz glass. The reinforcement bodies with a specific density $D_{K1}$ are here embedded in a $SiO_2$ matrix with a specific glass density $D_M$. Starting from this, in order to provide a blank of opaque quartz glass that is less susceptible to cracking and illustrates homogeneous transmission even in the case of small wall thicknesses, in one aspect sinterable reinforcement bodies are used, the specific density $D_{K0}$ of which prior to the sintering treatment is lower than the specific glass density $D_M$, and which due to the sintering treatment reach the specific density $D_{K1}$ which differs from the specific glass density $D_M$ by less than 10%.

13 Claims, 3 Drawing Sheets

(56) References Cited

U.S. PATENT DOCUMENTS

| | | | | |
|---|---|---|---|---|
| 5,674,792 | A | * | 10/1997 | Moritz ............... B22C 9/12 |
| | | | | 501/133 |
| 6,165,926 | A | * | 12/2000 | Kriechbaum ......... C04B 35/101 |
| | | | | 501/127 |
| 6,660,671 | B2 | * | 12/2003 | Werdecker ............. C03B 19/06 |
| | | | | 423/335 |
| 6,699,808 | B1 | * | 3/2004 | Schwertfeger ......... B82Y 30/00 |
| | | | | 423/335 |
| 2003/0119648 | A1 | * | 6/2003 | Werdecker ............. C03B 19/06 |
| | | | | 501/32 |
| 2010/0178509 | A1 | * | 7/2010 | Schumacher ........... C03B 19/06 |
| | | | | 428/402 |
| 2015/0050419 | A1 | * | 2/2015 | Weber ................... C03B 19/066 |
| | | | | 427/140 |

OTHER PUBLICATIONS

Zhang (Zhang, J., Tu, R., Goto, T., "Fabrication of transparent SiO2 glass by pressureless sintering and spark plasma sintering", Ceramics International 38 (2012) 2673-2678).*

Sawyer, Robert, "Heraeus Fused Silica Opaque Optical Diffuser Material: HOD500," Heraeus, Heraeus Group and Heraeus Quarzglas, pp. 19 (Nov. 18, 2015).

* cited by examiner

METHOD FOR PRODUCING OPAQUE QUARTZ GLASS, AND BLANK MADE FROM THE OPAQUE QUARTZ GLASS

CROSS-REFERENCE TO RELATED APPLICATION

This Utility Patent Applications claims priority to European Patent Application No. EP 16 206 682.3, filed on Dec. 23, 2016, which is incorporated herein by reference.

BACKGROUND

One aspect refers to a method for producing opaque quartz glass by producing a green body from a slip containing fine, amorphous $SiO_2$ particles and coarse $SiO_2$ reinforcement bodies and by sintering it by way of a sintering treatment into a blank made from the opaque quartz glass.

One aspect deals with a blank of opaque quartz glass in which $SiO_2$ reinforcement bodies are embedded in a matrix of porous $SiO_2$ with a specific glass density $D_M$.

A method for producing an opaque, closed-pore material from opaque quartz glass is disclosed in DE 43 38 807 C1. For this purpose, naturally occurring quartz feedstock is purified, fused by electrofusion into quartz glass, and the quartz glass is subsequently ground into fine $SiO_2$ particles with a purity of more than 99.99% $SiO_2$. This $SiO_2$ graining has a grain size distribution in which 80% of the particles have a size in the range of 355-2000 µm, 19% are smaller than 355 µm and 1% is larger than 2000 µm. This $SiO_2$ graining is further comminuted by wet milling in deionized water for 240 h by using grinding balls of quartz glass. After wet milling the grain size is in the range between 0.45 µm and 50 µm, wherein about 60% of the $SiO_2$ particles have a size in the range of 1 µm to 10 µm. The dispersion produced thereby, also called "slip", has a solids content of about 78% and is cast into a plaster mold, dried into a green body, and the green body is compacted by sintering at a temperature of 1400° C. for a holding period of 60 min to obtain the closed-pore component of opaque quartz glass.

The opaque quartz glass material obtained has a porosity in the range of 0.5 to 2.5%, with at least 80% of the pores having a pore size of less than 20 µm, preferably less than 10 µm. It is characterized by a high chemical purity of at least 99.9% $SiO_2$, a density in the range of at least 2.15 and preferably up to 2.18 g/cm³, and—due to its opacity—a low spectral transmission. This defines the proportion of light intensity emitted from the component of a certain wavelength in relation to the incident light intensity (without taking into account the losses caused by surface reflections during light penetration). The spectral transmission is in the wavelength range from 190 nm to 2650 nm below 10% at a virtually constant level.

Components made of this opaque quartz glass are therefore particularly suitable for thermal insulation at high temperatures, and they also exhibit the typical and advantageous properties of quartz glass, such as a low coefficient of thermal expansion, high temperature stability and good chemical resistance to many process media. For this reason, such components have been used for many years especially in semiconductor manufacturing for processing semiconductor components and optimizing heat management in process chambers. The components typically take the form of reactors, apparatus, carrier racks, bells, crucibles, protective shields or simple quartz glass components such as tubes, rods, plates, flanges, rings or blocks.

The slip casting method, however, poses fundamental problems due to the shrinkage of the green body during drying and sintering. Specifically, shrinkage and sintering cracks may occur. These cannot be eliminated at low sintering temperatures, but only by way of a complete fusion of the glass, which however would mean a loss of opacity of the quartz glass. During demolding of the green body, forces are bound to act on the body and may already lead to the formation of cracks due to low plasticity.

This problem increases with increasing component size. This applies in particular to the formation of shrinkage cracks. Due to the opacity of the sintered component, however, conventional fluoroscopy methods can only detect material defects close to the surface. For the detection and localization of particularly critical cracks in the volume of the opaque component, complex examination methods are required, for example ultrasound examination methods, which do not always lead to reliable results.

In the final analysis, even complex examination methods cannot prevent cracked components from being useless and normally representing material waste which causes high costs especially in the case of large quartz-glass components and due to the expenditure of time and material involved in their manufacture. Although cracks near the surface can be removed by mechanical post-processing, this requires a sufficient oversize before processing.

DE 10 2006 052 512 A1, which discloses a method and a blank of the aforementioned type, deals with the problem of crack formation. This publication suggests a reinforcement of the opaque quartz glass with quartz glass fibers. For the production of the reinforced porous quartz glass the slip which is known from DE 43 38 807 C1 and consists of amorphous, finely ground $SiO_2$ particles is started from and an addition in the form of quartz glass fibers with a weight percentage of 4% is added to this slip. The quartz glass fibers are solid fibers of high-purity quartz glass with an outer diameter of about 14 µm and an average length of about 20 mm. By comparison with the other fine $SiO_2$ particles which are produced by grinding and are contained in the slip and have a particle size distribution distinguished by a $D_{50}$ value of about 8 µm and by a $D_{90}$ value of about 40 µm, the quartz glass fibers in the green body represent coarse particles.

Due to their density and size the quartz glass fibers stabilize the green body and they reduce shrinkage caused by drying and sintering. The green-body base mass and the additive consist of amorphous $SiO_2$ and have similar physical and chemical properties, which prevents the formation of tensions during drying and sintering of the green body and contributes significantly to its mechanical stability already in the wet state and in the green-body state. The formation of cracks can thereby be reduced and the handling of the green body can be facilitated.

After mold casting of the slip and drying and sintering of the green body a quartz glass blank is obtained, in which the former, finely ground amorphous $SiO_2$ particles form an opaque quartz glass matrix in which the quartz glass fibers are embedded as glassy portions.

The paper of Robert Sawyer et al.: "Silica Opaque Optical Diffuser Material: HOD500"—published in URL: https://optics.msfc.nasa.gov/sites/optics.msfc.nasa.gov/files/27Heraeus Quartz Glass Opaque Optical Diffuser.pdf—describes a quartz glass diffuser material with a large number of pores with a pore size of less than 25 µm and an almost constant reflectivity in the wavelength range from 250 to about 2500 nm.

EP 1 245 703 A discloses a method for producing a gas-impermeable molding made of opaque, synthetically produced quartz glass using the slip casting method. Porous, pre-compacted and fully vitrified granulate particles are used as $SiO_2$ starting material. The $SiO_2$ granulate particles pre-compacted at 1200° C. in the rotary kiln have particle sizes ranging from 200 to 500 μm.

For these and other reasons, a need exists for the present embodiments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

Although the proportion of glassy particles in the opaque quartz glass matrix reduces the formation of cracks, it also has an influence on the transmission characteristics of the material. Volume portions occupied by quartz glass fibers are more transparent than portions of the porous matrix. The difference in opacity is particularly noticeable in the case of small wall thicknesses as local, not accurately reproducible inhomogeneity of the transmission and is undesired for some applications of the material.

It is therefore the object of one embodiment to provide a blank of opaque quartz glass that is less susceptible to cracking and illustrates homogeneous transmission even in the case of small wall thicknesses. It is the object of one embodiment to indicate a method which allows the manufacture of opaque quartz glass according to the slip method.

With regard to the method, this object starting from a method of the aforementioned type is achieved according to one embodiment in that sinterable reinforcement bodies are used, the specific density $D_{K0}$ of which prior to the sintering treatment is lower than the specific glass density $D_M$, and which due to the sintering treatment reach the specific density $D_{K1}$ which differs from the specific glass density $D_M$ by less than 10%, and which have a mean particle size ($D_{50}$ value) of at least 500 μm.

The reinforcement causes a mechanical stabilization of the green body and reduces shrinkage during drying and sintering. It facilitates the production of blanks close to the final contour. In contrast to the generic method, the slip is mixed with sinterable reinforcement bodies made of porous $SiO_2$. The sinterable reinforcement bodies are thermally further compacted together with the green body matrix only during the subsequent sintering treatment of the green body so that their density $D_{K1}$ corresponds exactly to the glass density $D_M$ of the matrix in the ideal case, but differs by not more than 10% therefrom upwards or downwards. The reference value for the percentage value is the glass density $D_M$.

The specific glass density $D_M$ is the mean density of the matrix. It is independent of the density $D_{K1}$ of the reinforcement bodies and generally corresponds to the density that the opaque quartz glass should have, for example according to the specification or another specification, regardless of whether or not $SiO_2$ reinforcement bodies are contained in it. It is typically in the range between 2.10 and 2.18 g/cm$^3$, but in one embodiment at least 2.15 g/cm$^3$, and it is a decisive factor in determining the transmission behavior of opaque quartz glass.

Due to the fact that the specific density $D_{K0}$ of the $SiO_2$ reinforcement bodies prior to this sintering treatment is lower than the specific glass density, the specific density $D_K$ of the $SiO_2$ reinforcement bodies comes close to the specific glass density $D_M$ during sintering of the green body.

The $SiO_2$ reinforcement bodies should reduce the risk of cracking in the green body, but their presence should hardly change the specific density and the optical properties of the opaque quartz glass, if possible. Therefore, $SiO_2$ reinforcement bodies are used whose porosity is pre-adjusted to have a specific density after sintering which deviates from the nominal specific glass density by less than +/−10%, in one embodiment less than +/−5%. Ideally, the $SiO_2$ reinforcement bodies do not influence the specific density of the composite, that is, the reinforcement bodies have the same density as the opaque quartz glass of the matrix after the sintering treatment of the green body.

The result is porous, opaque quartz glass with a matrix of porous $SiO_2$, in which reinforcement bodies made of also porous $SiO_2$ are distributed, whereby the two $SiO_2$ phases (matrix/reinforcement bodies) do not differ in terms of their densities $D_{K1}$, $D_M$ and thus also in terms of their transmission behavior, or differ as little as possible.

The mechanically stabilizing effect of the SiO$_2$ reinforcement bodies during drying and sintering of the green body depends on their mean particle size (D$_{50}$ value), which is therefore at least 500 μm. The D$_{50}$ value represents the particle size that is not reached by 50% of the cumulative particle volume (median value). The particle size of the reinforcement bodies changes only slightly during sintering to the finished blank. The said minimum value refers to the particle size distribution before sintering the green body to the quartz glass blank.

The geometric shape of the reinforcement body particles is regular, but in one embodiment irregular. For example, SiO$_2$ reinforcement bodies can be obtained by crushing or grinding a porous molding and, if necessary, have fractured surfaces. The fragments do not usually have a spherical morphology, but a non-spherical, broken morphology, which is hereinafter referred to as "splintery morphology". This is beneficial for dense, flat agglomeration and mutual interlocking of the SiO$_2$ fragments. This flat interlocking of the fracture surfaces of the SiO$_2$ reinforcement bodies forms a kind of "house of cards structure", which enables a higher density of the green body and has a positive effect on the green strength. In one embodiment, at least 80% of SiO$_2$ reinforcement bodies, in one embodiment at least 90% of SiO$_2$ reinforcement bodies with a particle size of more than 100 μm have a non-spherical, splintery morphology with an aspect ratio of at least 2.

The green body is a solid body, a hollow body or a layer on a base body. The green body is usually obtained by pouring the slip into a mold. However, other processing methods are also suitable, such as sucking into a mold, dipping, spraying, painting, filling, peeling, drawing, drawing, squeezing and the like.

The intensity of the sintering treatment is determined by its temperature and time profile, in simple terms, by the "sintering temperature" and the "sintering time". The amorphous SiO$_2$ particles and the SiO$_2$ reinforcement bodies are subjected to the same sintering treatment in the green body, but they differ in their sintering activity. The sintering activity of the amorphous SiO$_2$ particles is mainly determined by their particle size, particle density (green density) and particle size distribution. These parameters, together with the desired physical properties of the final product, determine the intensity of the sintering treatment of the green body. This is the measure of the porosity of the SiO$_2$ reinforcement bodies to be maintained prior to sintering. The higher the sintering activity of the amorphous SiO$_2$ particles, the lower the initial density $D_{K0}$ of the SiO$_2$ reinforcement bodies prior to sintering treatment. A density of SiO$_2$ reinforcement bodies prior to sintering treatment in the range between 85 to 95% of the nominal specific glass density (2.10 and 2.18 g/cm$^3$) has proved to be a suitable guide.

The SiO$_2$ reinforcement bodies form their own phase in the SiO$_2$ matrix, although ideally hardly visible. They can act as optical defects regardless of their density if the refractive indices of the reinforcement body and matrix differ from each other. If this is undesirable, the two phases (matrix/reinforcement body) consist of a SiO$_2$ material that is as identical as possible, in one embodiment with a SiO$_2$ content of at least 99.9% by weight.

Opaque quartz glass is in one embodiment produced which has a direct spectral transmission $T_G$ at measurement wavelengths of 1700 nm and 3200 nm, wherein reinforcement bodies are used which, as a result of the sintering treatment, achieve a direct spectral transmission $T_K$ at the measurement wavelengths which deviates from $T_G$ by less than 0.05 percentage points, in one embodiment by less than 0.02 percentage points. The deviation is calculated as the amount value of the difference $|T_G-T_K|$. The measurement wavelengths 1700 and 3200 nm represent wavelength ranges that are influenced as little as possible by pronounced absorption bands. The transmission $T_G$ of opaque quartz glass refers to both the pure matrix material (without SiO$_2$ reinforcement bodies) and the opaque quartz glass containing SiO$_2$ reinforcement bodies.

The green-dense SiO$_2$ reinforcement bodies, which is still sinterable, can be produced by known shaping processes such as granulation processes. In order to minimize the difference in composition between SiO$_2$ matrix and SiO$_2$ reinforcement body, however, a process variant is in one embodiment in which the reinforcement bodies are produced by compacting fine, amorphous SiO$_2$ particles into a porous molding as a result of pre-compaction, and the porous molding is comminuted into the reinforcement bodies.

The porous molding to be comminuted is a partially compacted body produced by conventional shaping processes such as pressing, casting, granulating or plastic deformation. The SiO$_2$ reinforcement bodies obtained by comminuting consist of the same amorphous SiO$_2$ particles, which are also fed to the slip for the production of the green body, except that the SiO$_2$ reinforcement bodies represent rather large aggregates or agglomerates of the SiO$_2$ particles, which have been pre-compacted by mechanical and/or thermal treatment before. Ideally, they only develop their strength-enhancing effect in wet and dry green bodies, whereas after sintering they do not illustrate any noticeable optical or mechanical differences to the porous quartz glass matrix. The opaque quartz glass is therefore not a composite or composite material in the usual sense, in which an additional component is intended to change the properties of the composite.

Mechanical pre-compaction is achieved, for example, by uniaxial or isostatic pressing, and thermal pre-compaction by pressure-free or pressure-supported sintering, such as gas pressure sintering. The pre-compacted molding and the SiO$_2$ reinforcement bodies produced therefrom by comminution have a density $D_{K0}$ which is lower than the nominal specific glass density DG.

In one embodiment procedure, the pre-compaction method is to include a pre-sintering treatment in which a maximum pre-sintering temperature is set, which is lower in the range of 20 to 100° C. than a maximum sintering temperature during the sintering treatment.

The SiO$_2$ reinforcement bodies are here subject to a double thermal compaction, namely by the pre-sintering treatment of the molding and by the actual sintering treatment of the green body with the reinforcement bodies contained therein. The pre-sintering temperature is lower than the sintering temperature in order to prevent the density of the reinforcement bodies from deviating too much from the specific glass density due to the double compaction and, as a result, its spectral transmission $T_K$ from the transmission $T_G$ and from the given, visually recognizable translucency of the opaque quartz glass matrix.

The geometric shape of the particles of the reinforcement bodies is regular, but in one embodiment irregular. For example, SiO$_2$ reinforcement bodies can be obtained by crushing or grinding a porous molding and, if necessary, have fractured surfaces. The fragments do not usually have a spherical morphology, but a non-spherical, broken morphology, which is hereinafter referred to as "splintery morphology". This is beneficial for dense, flat agglomeration and mutual interlocking of the $SiO_2$ fragments. This flat interlocking of the fracture surfaces of the $SiO_2$ reinforcement bodies forms a kind of "house of cards structure", which enables a higher density of the green body and has a positive effect on the green strength. In one embodiment, at least 80% of $SiO_2$ reinforcement bodies, and in one embodiment at least 90% of $SiO_2$ reinforcement bodies with a particle size of more than 100 µm have a non-spherical, splintery morphology with an aspect ratio of at least 2.

Particularly with regard to an effective stabilization of the green body during drying and sintering, it has turned out to be useful when the $SiO_2$ reinforcement bodies have a mean particle size ($D_{50}$ value) of at least 1000 µm, in one embodiment at least 1500 µm and in one embodiment at least 5000 µm. The $D_{50}$ value represents the particle size that is not reached by 50% of the cumulative particle volume (median value).

It has also proved to be advantageous in one embodiment if the ratio of the mean particle size of the $SiO_2$ reinforcement bodies and the mean particle size ($D_{50}$ value) of the fine, amorphous $SiO_2$ particles is between 1:5 and 1:500.

The particle sizes of the amorphous $SiO_2$ particles are typically in the range up to a maximum of 200 µm, in one embodiment up to a maximum of 100 µm, with $SiO_2$ particles with particle sizes in the range between 1 µm and 60 µm representing the largest volume fraction. Their particle size distribution is typically defined by a $D_{50}$ value of less than 50 µm, in one embodiment less than 40 µm. In contrast, the particle sizes of $SiO_2$ reinforcement bodies are in one embodiment in the range between 0.1 and 10 mm.

The volume ratio of the $SiO_2$ reinforcement bodies and the fine, amorphous $SiO_2$ particles in the slip is in one embodiment between 1:3 and 3:1. This volume ratio also corresponds to the preferred volume ratio of $SiO_2$ matrix and $SiO_2$ reinforcement bodies after sintering in one embodiment.

The reinforcement serves to mechanically stabilize the green body. The physical properties of the opaque quartz glass produced therefrom should not interfere with the reinforcement, if possible. From this point of view, the volume fraction of the reinforcement should be as large as necessary but as small as possible. On the other hand, it is precisely the effect of one embodiment that a reinforcement is used, which mechanically stabilizes the green body and reduces shrinkage during drying and sintering, but which has as little effect as possible on the physical properties of the opaque quartz glass and, for example, its transmission. From this point of view, the volume fraction of the reinforcement should be as high as possible. The minimum volume of reinforcement bodies (above ratio 1:3) is due to the fact that there should be no segregation thereof in the cast slip. Upwardly (above ratio 3:1), the volume fraction of the reinforcement bodies is limited by the risk of void formation, which can lead to the formation of pores or voids. Depending on the geometry of the green body, the volume proportion of $SiO_2$ reinforcement bodies is thus between 33% and 67%, in one embodiment between 40% and 60%.

The blank of opaque quartz glass which is obtained after sintering of the green body is a solid body, hollow body or it forms an opaque quartz glass layer on a base body. It is used to produce a component made of opaque quartz glass that is less susceptible to cracking. The opacity is illustrated by the fact that the direct spectral transmission in the wavelength range between 200 nm and 2500 nm is below 2%. Accordingly, a high reflectance of more than 95% results in the infrared wavelength range. The near-surface layer of the blank can be transparent.

With regard to this blank, the abovementioned technical object starting from a blank of the above-mentioned type is achieved according to one embodiment in that the $SiO_2$ reinforcement bodies are porous and have a specific density $D_{K1}$ which differs from the specific density $D_M$ of the matrix by less than 10%, and that the $SiO_2$ reinforcement bodies have a mean particle size ($D_{50}$ value) of at least 500 µm.

Hence, in the blank according to one embodiment, a matrix of opaque quartz glass contains areas of porous quartz glass that are distributed as homogeneously as possible and are to be assigned to the original $SiO_2$ reinforcement bodies, whose porosity, however, does not differ from that of the matrix or only slightly. The deviation relative to the glass density $D_M$ is not more than +/−10%. The phase boundaries of the original $SiO_2$ reinforcement bodies are still visible under a microscope, but they do not act as optical defects or, if possible, do not act as optical defects.

The particle size of the former reinforcement bodies is determined by means of microscopic image analysis. The said minimum value refers to the particle size distribution in the sintered quartz glass blank.

The blank is in one embodiment obtained by means of a slip casting method. It is a solid body, a hollow body or the blank forms an opaque quartz glass layer on a base body. The blank serves as a component made of opaque quartz glass or is further processed into a component made of opaque quartz glass by simple mechanical or thermal post-processing, such as mechanical surface smoothing.

Advantageous configurations of the blank according to one embodiment result from the sub-claims. Insofar as configurations of the blank, which are indicated in the sub-claims, are based on the procedures specified in claims for the method according to the embodiments, reference is made to the above statements on the corresponding method claims for a supplementary explanation.

Definitions and Measurement Methods

Individual method steps and terms of the above description as well as measurement methods are defined in the following in a supplementary way. The definitions are an integral part of the description of the embodiments. In the event of a contradiction in content between one of the following definitions and the remaining description, what is stated in the description shall prevail.

Quartz Glass

Quartz glass is here defined as highly siliceous glass with a $SiO_2$ content of at least 90 mole %.

Slip

The term "slip" is used for a suspension of a liquid and $SiO_2$ solid particles. Water purified by distillation or deionization can be used as a liquid to minimize the content of impurities.

Particle Size and Particle Size Distribution

Particle size and particle size distribution of the fine, amorphous $SiO_2$ particles are characterized by the $D_{50}$ values. These values are taken from particle size distribution curves illustrating the cumulative volume of $SiO_2$ particles as a function of particle size. The $D_{50}$ value indicates the particle size that is not reached by 50% of the cumulative volume of $SiO_2$ particles. The particle size distribution is determined by scattered light and laser diffraction spectroscopy according to ISO 13320.

Particle size and particle size distribution of the coarse $SiO_2$ reinforcement bodies are determined microscopically. For non-spherical $SiO_2$ reinforcement bodies with an aspect ratio of more than 2, the longest dimension is determined by microscopic image analysis using the so-called "Feret diameter" of particles, as defined in standard DIN 66141 and ISO-13322-2.

Splintery $SiO_2$ Reinforcement Bodies and Aspect Ratio

During the comminution of a partially compacted porous $SiO_2$ molding, fragments of the original molding are produced which illustrate fracture surfaces and, as a rule, a splintery, non-spherical morphology with an aspect ratio (also known as "structural ratio") of at least 2. The "aspect ratio" is the ratio of the largest structural width of the fractional particle and its thickness. An aspect ratio of at least 2 therefore means that the largest structural width is at least two times greater than its thickness.

Sintering

"Sintering" or "thermal compaction" refers to a process step in which a green body is treated at an elevated temperature of more than 1100° C. Sintering/compaction takes place under air, inert gas or vacuum. Vacuum means an absolute gas pressure of less than 2 mbar.

Measurement of the Pore Volume

The "pore volume" of a porous material refers to the free volume occupied by cavities within the material. The pore volume is measured, for example, by means of a porosimeter, wherein a non-wetting liquid (such as mercury) is pressed into the pores of a porous material against the opposing surface tension forces under the influence of an external pressure. The force required for this is inversely proportional to the pore size and therefore, in addition to the total pore volume, the pore size distribution of the sample can also be determined. Mercury porosimetry only records pore sizes above 2 nm (mesopores and macropores). "Micropores" are pores with pore sizes of less than 2 nm. Their contribution to porosity and specific surface area is determined by means of nitrogen absorption using the V-t method, wherein a sample is held at different pressures and 77 K. The method is similar to the BET method, with the pressure range being extended to higher pressures so that surfaces of the non-microporous part of the material are also covered.

Particle Size and Particle Size Distribution

Particle size and particle size distribution of the fine amorphous $SiO_2$ particles are characterized by the $D_{50}$ values. These values are taken from particle size distribution curves illustrating the cumulative volume of $SiO_2$ particles as a function of particle size. The $D_{50}$ value indicates the particle size that is not reached by 50% of the cumulative volume of $SiO_2$ particles. The particle size distribution is determined by scattered light and laser diffraction spectroscopy according to ISO 13320.

With $SiO_2$ reinforcement bodies, particle size and particle size distribution are determined microscopically. For non-spherical $SiO_2$ reinforcement bodies with an aspect ratio of more than 2, the longest dimension is determined by microscopic image analysis using the so-called "Feret diameter" of particles, as defined in standards DIN 66141 and ISO-13322-2.

Measurement of Optical Transmission

Transmission is determined spectroscopically as direct spectral transmission in the wavelength range from 190 to 4800 nm; this means that reflection losses on the surfaces of the measurement sample are not deducted. The radiolucent thickness of the measurement sample is 3 mm.

Embodiment

The invention will now be explained in more detail with reference to embodiments and a drawing. In detail, The method according to the embodiments are now explained by way of example with reference to the manufacture of a flange for a quartz glass reactor for the treatment of semiconductor wafers.

Figure 2:
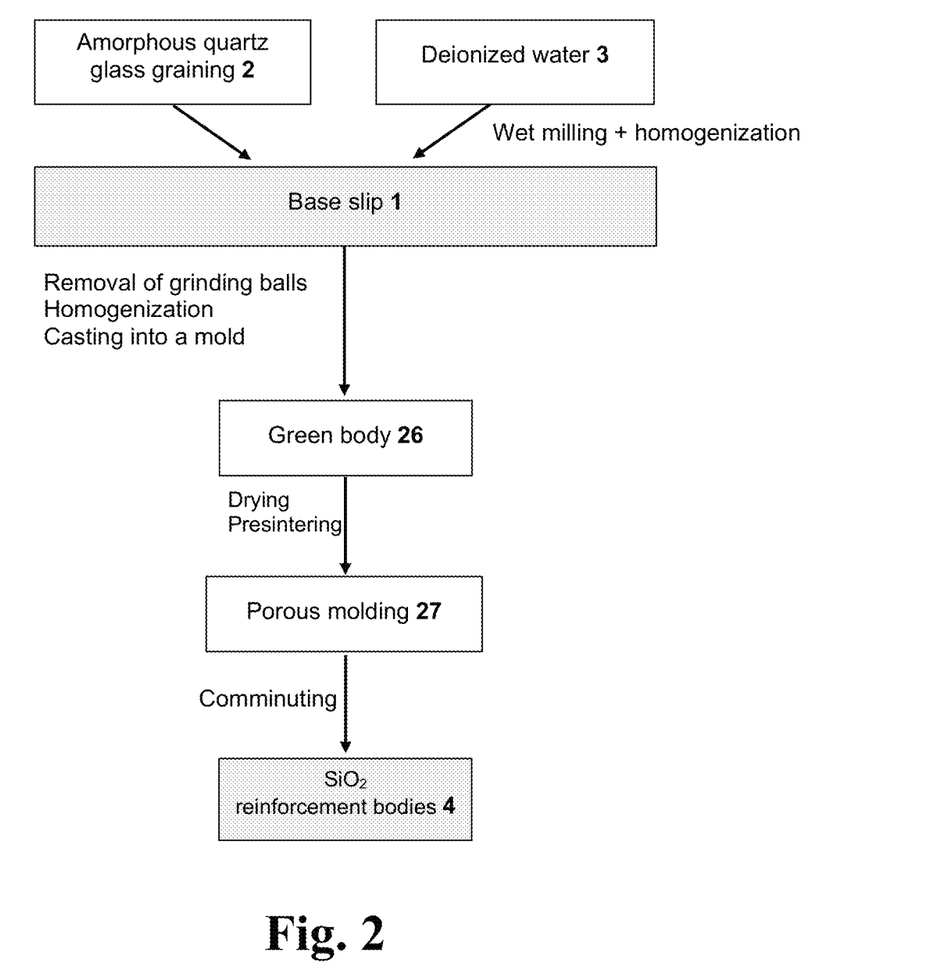
FIG. 2 illustrates a flow diagram for explaining the manufacture of $SiO_2$ reinforcement bodies for use in the process sequence of FIG. 1.

Production of Porous $SiO_2$ Reinforcement Bodies (FIG. 2)

A homogeneous base slip 1 is produced. For a batch of 10 kg of base slip ($SiO_2$-water slip), 8.2 kg of amorphous quartz glass graining 2, obtained by melting natural quartz raw material and having grain sizes in the range between 250 μm and 650 μm, are mixed—in a drum mill lined with quartz glass and having a capacity of approx. 20 liters—with 1.8 kg of deionized water having a conductivity of less than 3 μS. The quartz glass graining 2 has been pre-cleaned in a hot chlorination process; care is taken to ensure that the cristobalite content is less than 1% by weight.

This mixture is ground by means of grinding balls of quartz glass on a roller block at 23 rpm for 3 days until a homogeneous base slip 1 with a solids content of 78% is formed. In the course of wet grinding, the quartz glass graining is further comminuted and the pH is reduced to about 4 as a result of the dissolving $SiO_2$.

The grinding balls are subsequently removed from the base slip 1 obtained in this way and the slip is homogenized for another 12 hours. The homogeneous base slip 1 thus obtained contains amorphous $SiO_2$ particles with a particle size distribution characterized by a $D_{50}$ value of about 8 μm and a $D_{90}$ value of about 40 μm.

The slip is poured into a die-casting mold of a commercial die-casting machine and dewatered via a porous plastic membrane to form a porous green body 26. To remove bound water, the green body 26 is dried in a ventilated oven at approx. 200° C. for five days and then pre-sintered in a sintering furnace under air to form a porous molding 27.

For pre-sintering, the green body 26 is heated in a sintering furnace under air to a specified maximum temperature within one hour and kept at this temperature for 2 hours.

Preliminary Test

The pre-sintering of the green body 26 was carried out experimentally at different maximum temperatures of 1250, 1300, 1350, 1400 and 1450° C. The moldings 27 obtained in this way are still open-porous, as a dye penetration test illustrates. They consist of thermally compacted agglomerates of the former, ground quartz glass graining.

In order to determine the optimum porosity for the method according to one embodiment, the moldings 27 were sintered once again using the following standard sintering treatment, which corresponds to the usual sintering treatment of green bodies, as explained in FIG. 1 below: In a sintering furnace under air; heating up to 1450° C. within one hour; holding time at this temperature: 1 h.

From each of the doubly sintered moldings 27, a sinter sample was created for transmission measurement, ground to a thickness of 3 mm. For the preparation of a reference sample, a green body 26 was only compacted once during standard sintering treatment (1450° C./5 h). The optical and mechanical properties of this reference sample correspond to those of the standard material of opaque quartz glass. For example, this material illustrates a specified nominal specific density of 2.17 g/cm$^3$ and the associated low optical transmission.

Figure 4:
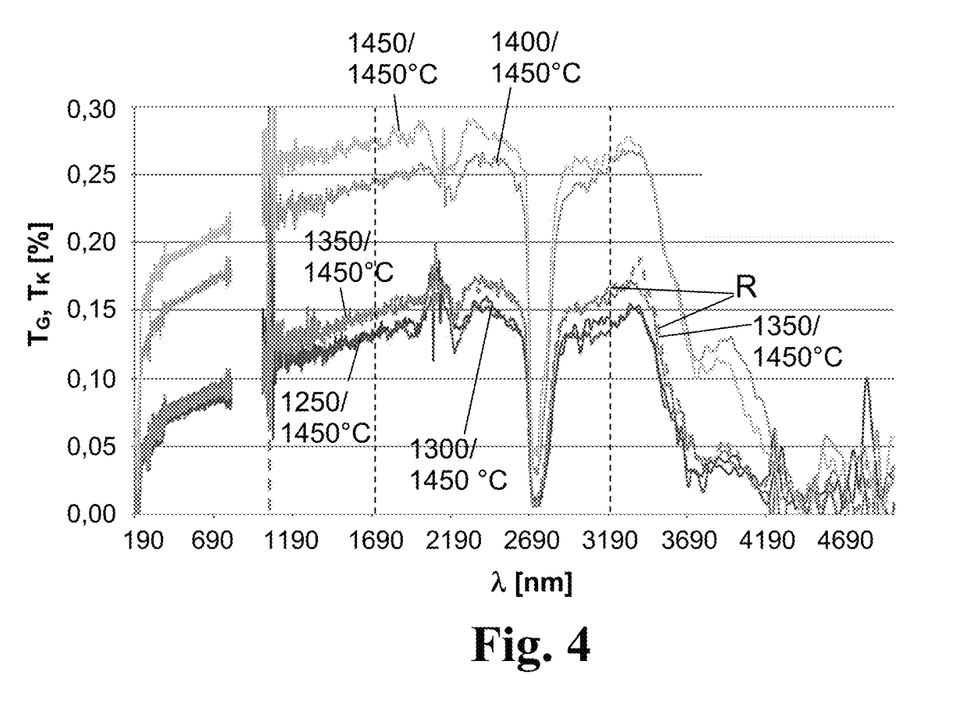
FIG. 4 illustrates a diagram with transmission curves of different sintering samples.

The diagram in FIG. 4 illustrates the results of transmission measurements as directed spectral transmission $T_G$ or $T_K$ (without reflection) in % over the wavelength range from 190 to about 4800 nm. The transmission curve of the single-sintered reference sample is called "R"; it represents the transmission $T_G$ of the glass matrix without addition of SiO$_2$ reinforcement bodies and has a nominal density of 2.16 g/cm$^3$. The transmission curves of the double-sintered samples illustrate the sintering temperature 1450° C. of the sintering treatment and the respective pre-sintering temperature of the reinforcement bodies. These transmission curves represent the specific transmission T$_K$ of the double-sintered SiO$_2$ reinforcement bodies.

Thus, the sample, which is sintered twice and pre-sintered at 1350° C., illustrates a transmission curve (T$_K$) over the entire wavelength range, which is almost identical with the transmission curve (T$_G$) of the reference sample R. Samples pre-sintered at 1250° C. and 1300° C. also illustrate great similarities with T$_G$ in their transmission patterns, but not the samples sintered at 1400° C. and 1450° C. These samples illustrate an increased translucency due to over-sintering. The differences between T$_G$ and T$_K$ at the wavelengths 1700 nm and 3200 nm are considered in the following Table 1 as representative of the degree of similarity in transmission behavior.

TABLE 1

Amount of the transmission difference |T$_G$-T$_K$| in percentage points

| Measurement wavelength [nm] | Presintering temperature/sintering temperature [° C.] | | | | |
|---|---|---|---|---|---|
| | 1250/1450 | 1300/1450 | 1350/1450 | 1400/1450 | 1450/1450 |
| 1700 | 0.025 | 0.025 | 0.0 | 0.1 | 0.125 |
| 3200 | 0.03 | 0.03 | 0.01 | 0.09 | 0.1 |

The smallest transmission difference between SiO$_2$ reinforcement bodies and matrix is obtained in the measurement sample in which the SiO$_2$ reinforcement bodies have been pre-compacted thermally at the temperature of 1350° C. After the final sintering treatment these achieve a direct spectral transmission T$_K$ which at the measurement wavelength of 1700 nm differs by a hardly measurable amount (about zero) and at the measurement wavelength of 3200 nm by just 0.01 percent points from the spectral transmission T$_G$ of the opaque quartz glass of the reference sample at these wavelengths.

The pre-sintered moldings 27 were comminuted into SiO$_2$ reinforcement bodies 4 and washed with hydrochloric acid. Samples with different particle size fractions were obtained by sieving the comminuted particles.

TABLE 2 particle size fractions of the SiO$_2$ reinforcement bodies

| Sample | Particle size fraction |
|---|---|
| 1 | 0.5-1 mm |
| 2 | 1-4 mm |
| 3 | 1.5-4 mm |
| 4 | 5-10 mm |
| 5 | 10-20 mm |

Figure 1:
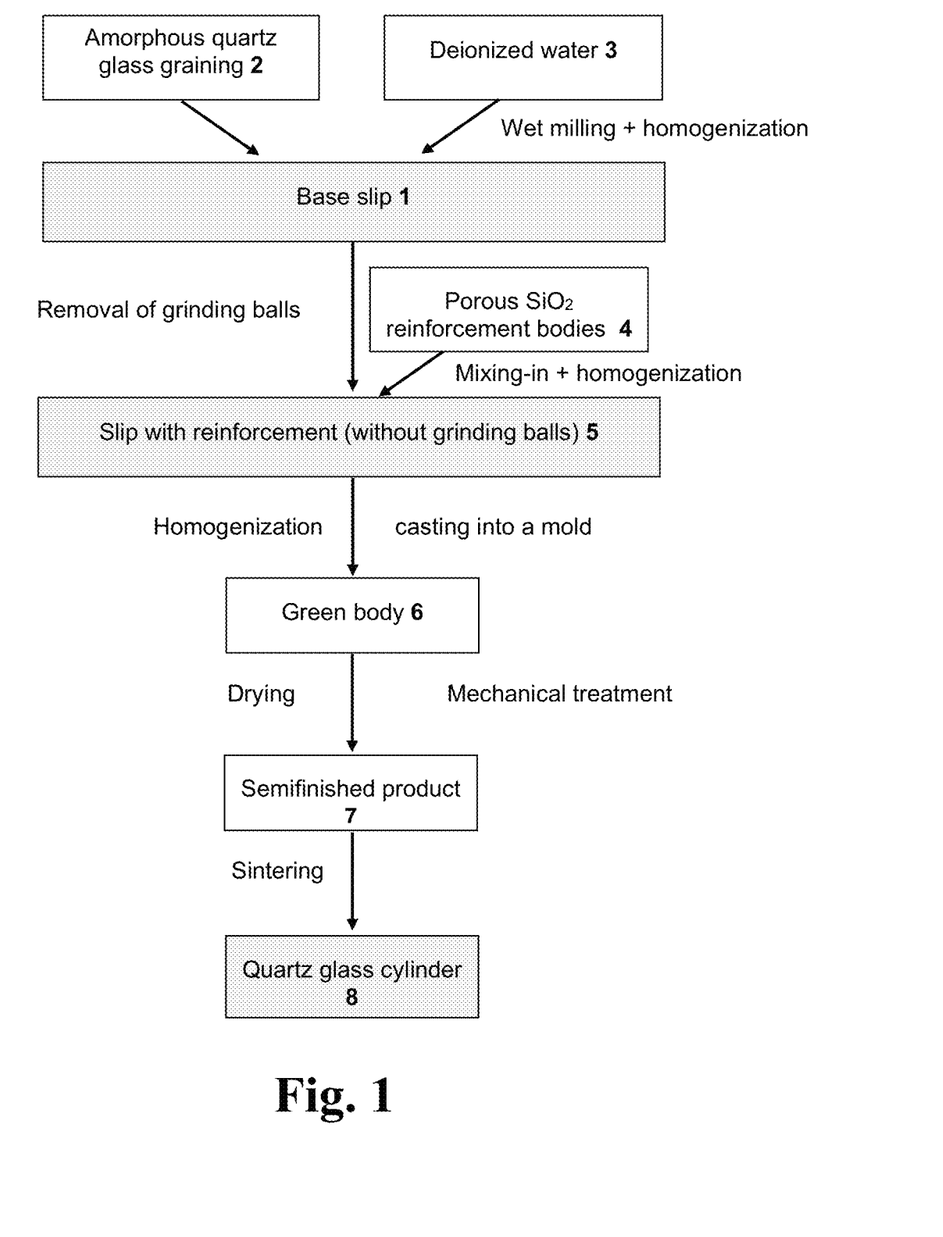
FIG. 1 illustrates a flow diagram for explaining the process sequence in the manufacture of a quartz glass cylinder on the basis of the method according to one embodiment.

Production of Opaque Quartz Glass Blanks with an Addition of SiO$_2$ Reinforcement Bodies (FIG. 1)

The same homogeneous base slip 1 is produced as described above with reference to FIG. 2. After removal of the grinding balls, the same volume of a dry bulk of SiO$_2$ reinforcement bodies 4 with particle size fraction from 1.5 to 4 mm (Sample 3 of Table 2) and a bulk density of 72% is added to the base slip 1. The slip 5 filled with the reinforcement addition is homogenized for a further 12 hours. The homogeneous slip 5 thus obtained contains fine amorphous SiO$_2$ particles with a particle size distribution characterized by a D$_{50}$ value of about 8 μm and a D$_{90}$ value of about 40 μm, and it contains coarse-grained SiO$_2$ reinforcement bodies 4 in the form of pre-sintered and comminuted moldings (27) with particle sizes between 1 and 4 mm. The volume content of SiO$_2$ reinforcement bodies 4 is 50% of the total solid.

The slip 5 is poured into a mold with an inner diameter of 180 mm and a height of 300 mm, as illustrated in FIG. 2 above. If necessary, base slip is refilled if SiO$_2$ reinforcement bodies protrude from the surface of the casting without wetting by slip.

The cylindrical green body 6 obtained after dewatering has a diameter of 180 mm and a height of 280 mm. These are very large dimensions for slip-cast bodies. It is dried as described above and then mechanically processed and ground to a semi-finished product 7. The semi-finished product 7 is fed into the sintering furnace and heated to the heating temperature of 1450° C. within 1 hour under air and kept at this temperature for 2 hours. Cooling down is carried out with a cooling ramp of 15° C./min to a furnace temperature of 500° C. and then unregulated with the sintering furnace closed.

Using this method, further opaque quartz glass blanks with an addition of SiO$_2$ reinforcement bodies were produced with the same volume content but different particle fractions according to Table 2. The inspection of the quartz glass cylinder 8 thus obtained for cracks using an ultrasonic measuring device did not yield a result in any case. However, the green bodies produced using Samples 2, 3 and 4 proved to be more robust and easier to handle during processing.

Figure 3:
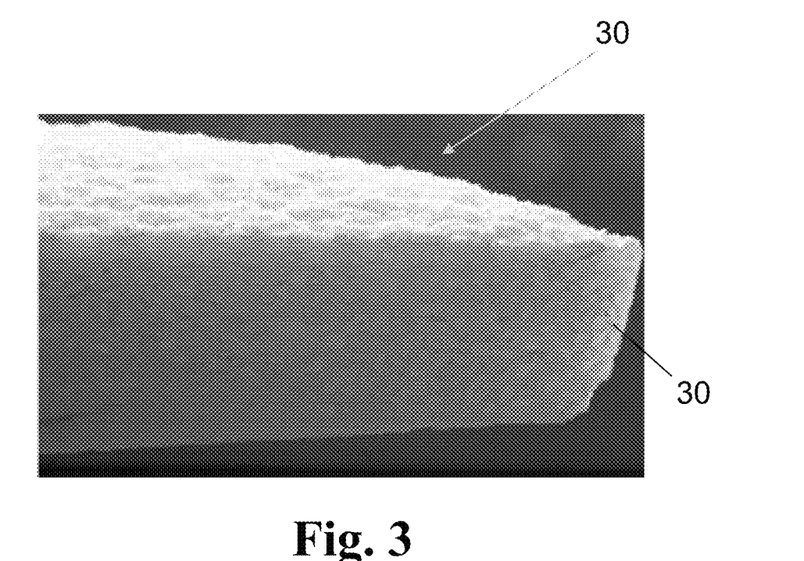
FIG. 3 illustrates a photo of a blank of opaque quartz glass with optically inhomogeneous volume portions as a comparative example.

The quartz glass cylinder 8 is characterized by a matrix of opaque quartz glass, in which areas of opaque, porous quartz glass, which belongs to the former porous SiO$_2$ reinforcement bodies, are homogeneously distributed. FIG. 3 illustrates a splinter 30 from the cylinder, which was produced by applying a reinforcement addition, which in FIG. 4 bears the temperature information 1450° C. In the translucent edge 31, inhomogeneities are recognizable which are due to the highly compacted SiO$_2$ reinforcement bodies whose density after sintering treatment is in the range of the density of undoped quartz glass (2.2 g/cm$^3$).

This quartz glass does not meet very high requirements for optical homogeneity. By contrast, no inhomogeneities can be discerned in the quartz glass cylinder, which was created by the use of a reinforcement addition, which bears the temperature information 1350° C. in FIG. 4. This quartz glass has a completely homogeneous white visual effect. In this case, the areas which can be assigned to the double thermally compacted SiO$_2$ reinforcement bodies have a density in the range of the nominal specific density of the opaque quartz glass, which is around 2.17 g/cm$^3$.

What is claimed is:

1. A method for producing an opaque quartz glass in that a green body is produced from a slip containing fine, amorphous SiO$_2$ particles and coarse, porous and sinterable SiO$_2$ reinforcement bodies and the green body is sintered by way of a sintering treatment into a blank made from the opaque quartz glass, in which reinforcement bodies with a specific density D$_{K1}$ are embedded n a SiO$_2$ matrix with a specific glass density D$_M$, characterized in that prior to the sintering treatment, the coarse, porous and sinterable SiO$_2$ reinforcement bodies embedded in the green body have a mean particle size ($D_{50}$ value) of at least 500 μm, and a specific density $D_{K0}$, which is lower than the specific glass density $D_M$, and wherein the coarse, porous and sinterable $SiO_2$ reinforced bodies due to the sintering treatment reach a specific density $D_{K1}$, which differs from the specific glass density $D_M$ by less than 10%.

2. The method according to claim 1, characterized in that the coarse, porous sinterable $SiO_2$ reinforcement bodies due to the sintering treatment reach a specific density $D_{K1}$ that differs from the specific glass density $D_M$ by less than 5%.

3. The method according to claim 1, characterized in that opaque quartz glass is produced that at a measurement wavelength of 1700 nm and 3200 nm has a direct spectral transmission $T_G$, and that due to the sintering treatment the coarse, porous and sinterable $SiO_2$ reinforcement bodies at a measurement wavelengths reach a direct spectral transmission $T_K$ that differs from $T_G$ by less than 0.05 percentage points.

4. The method according to claim 1, characterized in that opaque quartz glass is produced that at a measurement wavelength of 1700 nm and 3200 nm has a direct spectral transmission $T_G$, and that due to the sintering treatment the coarse, porous and sinterable $SiO_2$ reinforcement bodies at a measurement wavelengths reach a direct spectral transmission $T_K$ that differs from $T_G$ by less than 0.02 percentage points.

5. The method according to claim 1, characterized in that a nominal specific glass density has a value between 2.10 and 2.18 g/cm³, and that the specific density of the coarse, porous and sinterable $SiO_2$ reinforcement bodies prior to the sintering treatment is between 85% to 95% of said value.

6. The method according to claim 1, characterized in that a nominal specific glass density has a value between 2.15 and 2.18 g/cm³, and that the specific density of the coarse, porous and sinterable $SiO_2$ reinforcement bodies prior to the sintering treatment is between 85% to 95% of said value.

7. The method according to claim 1, characterized in that the reinforcement bodies are produced by a process comprising the following steps: (a) providing fine, amorphous $SiO_2$ particles; (b) pre-compaction of the fine, amorphous $SiO_2$ particles into a porous molding, and (c) comminuting the porous molding into the coarse, porous and sinterable $SiO_2$ reinforcement bodies.

8. The method according to claim 7, characterized in that pre-compaction comprises a pre-sintering treatment in which a maximum pre-sintering temperature is set, which in the range of 20-100° C. is lower than a maximum sintering temperature in the sintering treatment.

9. The method according to claim 1, characterized in that the coarse, porous and sinterable $SiO_2$ reinforcement bodies have a mean particle size ($D_{50}$ value) of at least 1000 μm.

10. The method according to claim 9, characterized in that the size ratio of the mean particle size of the coarse, porous and sinterable $SiO_2$ reinforcement bodies and the mean particle size ($D_{50}$ value) of the fine, amorphous $SiO_2$ particles is between 1:5 and 1:500.

11. The method according to claim 1, characterized in that the coarse, porous and sinterable $SiO_2$ reinforcement bodies have a mean particle size ($D_{50}$ value) of at least 1500 μm.

12. The method according to claim 1, characterized in that the coarse, porous and sinterable $SiO_2$ reinforcement bodies have a mean particle size ($D_{50}$ value) of at least 5000 μm.

13. The method according to claim 1, characterized in that the volume ratio of the coarse, porous and sinterable $SiO_2$ reinforcement bodies and the fine, amorphous $SiO_2$ particles in the slip is between 1:3 and 3:1.

\* \* \* \* \*